Nov. 6, 1951  J. SALTZBERG  2,573,988
ROTARY FIRE-BOWL BARBECUE STOVE

Filed April 22, 1949  3 Sheets-Sheet 1

Inventor,
Jack Saltzberg,
By Frederick E. Maynard,
Attorney.

Nov. 6, 1951  J. SALTZBERG  2,573,988
ROTARY FIRE-BOWL BARBECUE STOVE
Filed April 22, 1949  3 Sheets-Sheet 2

Inventor,
Jack Saltzberg,
By Frederick E. Maynard,
Attorney

Nov. 6, 1951  J. SALTZBERG  2,573,988
ROTARY FIRE-BOWL BARBECUE STOVE
Filed April 22, 1949  3 Sheets-Sheet 3

Inventor,
Jack Saltzberg;
By Frederick E. Maynard,
Attorney.

Patented Nov. 6, 1951

2,573,988

UNITED STATES PATENT OFFICE 2,573,988

ROTARY FIRE-BOWL BARBECUE STOVE

Jack Saltzberg, Los Angeles, Calif.

Application April 22, 1949, Serial No. 88,959

6 Claims. (Cl. 99—421)

This invention is a barbecue stove.

It is the general purpose of this invention to provide a portable, unitary barbecue stove which is efficiently useful as grill, a rotisserie, a smoker, a brazier, a camp stove or a room heater, and for other potential adaptations.

An intent of the invention is to provide a substantial, low cost, light weight, and compact barbecue stove which can be, by one hand, picked up and transferred from place to place for instant preparation for any one of a great number of kinds of cooking uses. Also, the invention provides a portable barbecue which can be stored in small recesses in a house or a cabin or small camp site, and, especially can be packed in a vehicle for road travel, or in a small boat of the pleasure type.

A feature is the provision of a handy carry-about barbecue which is very stable; that is, is not easily tipped over, and therefore reduces fire hazard.

A purpose is to provide an all metal barbecue incorporating a good sized bowl in which lump fuel is used and which is so mounted on a basal pedestal that it, the bowl, can be readily rotated on a horizontal axis to enable the use of divers methods of food cooking on the barbecue. Further, provision is made for the use of the bowl in an inverted position as a part of a handle whereby the barbecue can be picked up and carried as a unit.

A distinctive feature of the invention resides in means for so supporting the applicable spit that it is made possible to better orient the food body to be cooked to secure a more even and quicker cooking of a large food body which may be of a generally tapering form; such as a turkey. The intent is to present the side of the rotating body, which is toward the fire, along a line constantly parallel to the fire grate of the stove.

The invention resides in certain advancements in this art as set forth in the ensuing disclosure and has with above additional objects and advantages as hereinafter developed, and whose constructions, combinations and details of means, and the manner of operation will be made manifest in the following description of the herewith illustrative embodiment; it being understood that modifications, variations, adaptations and equivalents may be resorted to within the scope, spirit and principles of the invention as it is claimed in conclusion hereof.

Figure 1:
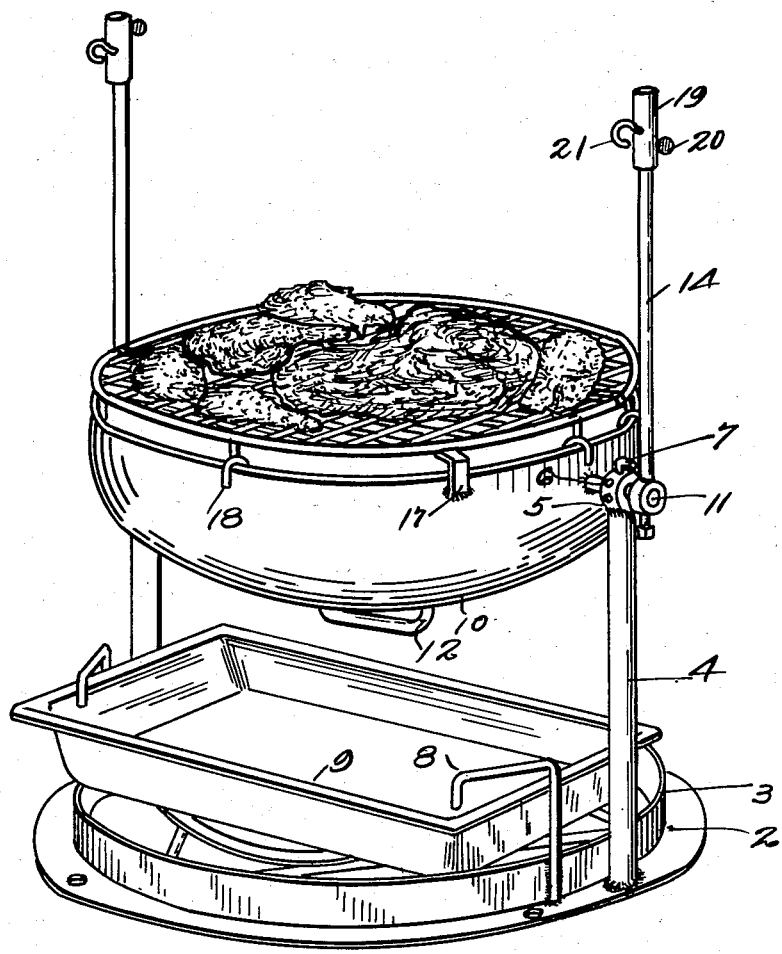
Figure 1 is a perspective of the stove with the fire bowl in horizontal position for broiling.

The supporting structure includes a basal ring 2 having a vertical flange 3 at the opposite sides of which are rigidly affixed posts 4 having bearing bosses 5 one of which is shown in Fig. 1 as having a series of key holes 6 to receive a locking key 7. The base ring has affixed thereto a pair of inverted hooks 8 for the purpose of interengaging with the rim of a removable grease pan 9; the function of the hooks being to prevent accidental overtipping of the pan.

Figure 3:
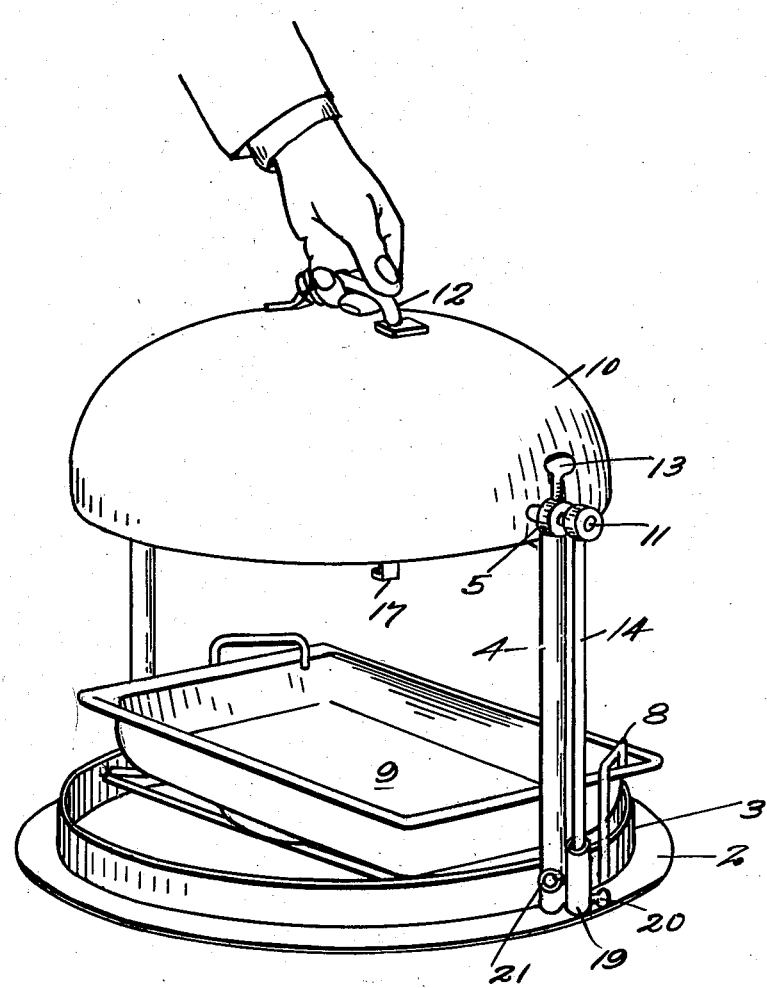
Figure 3 is a perspective of the stove with the bowl inverted so that a hand grip on its bottom can be clasped in one hand for ready carriage of the stove when handling is necessary.

A fuel holding bowl 10 has diametrically opposite, rigid trunnions 11 rotatively mounted in the bosses 5 and it can be safely locked in any of several positions by means of the key 7, Fig. 1. The bottom of the bowl has a fixed hand grip member 12 to facilitate hand carrying of the stove unit as in Fig. 3 wherein there is shown a set screw 13 which, also, may be used to fasten the adjusted bowl.

Figure 2:
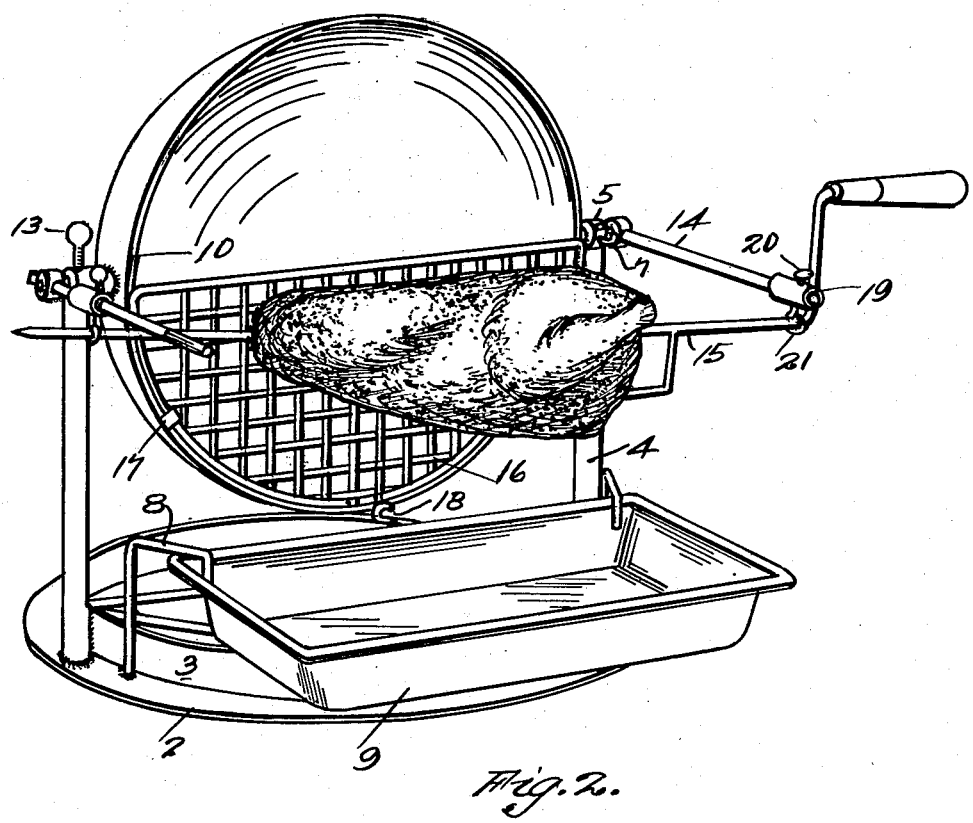
Figure 2 is a perspective of the bowl adjusted to a vertical face position for grilling of a food body.

Suitably fixed on the outer ends of the trunnions 11 are respective stiff arms 14 parallel to each other and projecting outwardly from the rim plane of the bowl. A noticeable feature of the barbecue is that it involves a means for a variety of angular position adjustments of an applied spit 15 with respect to the rim plane of the bowl and as to a fuel holding grate section 16 which is removably lodged on rigid lugs 17 provided therefor at suitable locations on the edge of the bowl rim; Fig. 2. The great section is of semicircular form and a pair of them is shown in Fig. 1 for use on the bowl for grill and other cooking purposes, and for this use the grate sections have rigidly attached hooks 18 to rest on the rim of the bowl.

Each arm 14 has thereon a freely slidable tube 19 which can be set at desired position along the arm as by a set screw 20, and each sleeve has a rigid keeper hook 21 to receive a desired spit.

As seen in Fig. 2 the spit can be obliquely hung by the adjusted slides on the said arms so that that side of the food body nearest to the grate section will lie generally parallel thereto. The spit may be rotated by hand or in any other manner as desired so that the entire surface will be repeatedly presented to the fire in the bowl for a desired period of time.

What is claimed is:

1. A portable barbecue stove including, in combination, a spit, a pedestal structure and a fire bowl longitudinally, transversely, pivotally mounted on said structure for rotation about the pivot axis for different cooking positions of the bowl, and a pair of frontal arms fixed rigidly to opposite sides of said bowl and having spit supporting members.

2. The stove of claim 1; said members being slidable along their arms whereby to vary the cooking angle of the spit as to the bowl.

3. A barbecue stove having, in combination, a spit, a basal structure and a fire bowl having side, transverse trunnions pivotally mounted on said structure for rotation of the bowl about a horizontal axis to several utility positions over said structure, and a pair of parallel arms rigid with the said bowl trunnions and projecting forwardly therefrom and having slidable spit carrying members enabling adjustment of an applied spit to present a tapered meat body with one side parallel to the fire.

4. The stove of claim 3; said structure consisting of a portable stand and the external bottom face of the bowl having a centrally affixed hand grip.

5. The stove of claim 3; said structure consisting of a pedestal including a pan rest and a set of anchors affixed thereto for holding a pan positioned on said rest.

6. A barbecue stove including, in combination, a spit, a pedestal having a pair of spaced uprights having fixed bearing bosses at their top ends, a fire bowl arranged between the said bosses and having radial trunnions turnably mounted in the bosses, means to fasten the bowl in a selected rotational position in the bosses, and having parallel arms fixed to said trunnions and spit supporting members adjustable along said arms for holding a spit at various angles to the face of the fire bowl.

JACK SALTZBERG.

REFERENCES CITED

The following references are of record in the file of this patent:

UNITED STATES PATENTS

| Number | Name | Date |
|---|---|---|
| 241,035 | Lumbert | May 3, 1881 |
| 848,018 | Englehard | Mar. 26, 1907 |
| 893,803 | Jones | July 21, 1908 |
| 1,085,671 | Day | Feb. 3, 1914 |
| 1,142,587 | Ledbetter | June 8, 1915 |
| 1,175,739 | Florer | Mar. 14, 1916 |
| 1,888,616 | Bocchino | Nov. 22, 1932 |
| 2,046,352 | Warner | July 7, 1936 |
| 2,048,769 | Anderson | July 28, 1936 |
| 2,463,171 | Guggenheim | Mar. 1, 1949 |
| 2,482,068 | Larson | Sept. 13, 1949 |
| 2,485,890 | Keljik | Oct. 25, 1949 |
| 2,486,345 | Triulzi | Oct. 25, 1949 |
| 2,505,976 | Leon | May 2, 1950 |

FOREIGN PATENTS

| Number | Country | Date |
|---|---|---|
| 2,390 | Great Britain | June 16, 1879 |
| 4,217 | Great Britain | Feb. 20, 1907 |
| 5,625 | Great Britain | Mar. 13, 1908 |
| 8,930 | Great Britain | July 8, 1886 |
| 109,664 | Austria | May 25, 1928 |